United States Patent
Nishikata et al.

(10) Patent No.: US 9,628,372 B2
(45) Date of Patent: Apr. 18, 2017

(54) DATA COMMUNICATION APPARATUS, DATA COMMUNICATION SYSTEM, AND DATA COMMUNICATION METHOD

(71) Applicant: FUJITSU LIMITED, Kawasaki-shi, Kanagawa (JP)

(72) Inventors: Yosuke Nishikata, Tokyo (JP); Koichi Ishibashi, Tokyo (JP); Yoshihiko Shirokura, Tokyo (JP); Yasuaki Kamimura, Tokyo (JP); Yukio Hayashi, Tokyo (JP); Takahiro Koharagi, Tokyo (JP); Kobun Nakajima, Tokyo (JP); Taiji Kondo, Chiba (JP); Takao Ito, Kawasaki (JP); Shinichi Hirata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 292 days.

(21) Appl. No.: 14/479,827

(22) Filed: Sep. 8, 2014

(65) Prior Publication Data
US 2014/0376359 A1  Dec. 25, 2014

Related U.S. Application Data

(63) Continuation of application No. PCT/JP2013/055849, filed on Mar. 4, 2013.

(30) Foreign Application Priority Data

Mar. 9, 2012 (JP) ................................ 2012-053830

(51) Int. Cl.
*H04L 12/707* (2013.01)
*H04W 40/34* (2009.01)
(Continued)

(52) U.S. Cl.
CPC .............. *H04L 45/22* (2013.01); *H04L 45/28* (2013.01); *H04W 4/04* (2013.01); *H04W 40/34* (2013.01);
(Continued)

(58) Field of Classification Search
CPC ...... H04L 45/22; H04L 45/28; H04L 41/0654; H04L 41/0659; H04L 41/0663;
(Continued)

(56) References Cited

U.S. PATENT DOCUMENTS

2005/0220076 A1* 10/2005 Kokado .............. H04L 12/2854
370/351
2006/0077974 A1* 4/2006 Goossens ................ H04L 45/00
370/389
(Continued)

FOREIGN PATENT DOCUMENTS

JP  2010-141656  6/2010
JP  2010-178145  8/2010
JP  4820464  9/2011

OTHER PUBLICATIONS

"Network Technology Supporting Intelligent Society: WisReed", *Fujitsu*, Sep. 2011, pp. 348-355, vol. 62, No. 3.
(Continued)

Primary Examiner — Ashley Shivers
(74) Attorney, Agent, or Firm — Staas & Halsey LLP

(57) ABSTRACT

A data communication apparatus forms a mesh network together with at least one gateway includes a frame generating unit and a frame transferring unit. The frame generating unit generates a meter data frame to transmit to a gateway. The meter data frame is a frame including meter data. The frame transferring unit transfers the meter data frame received from another data communication apparatus. The meter data frame is addressed to the gateway. The frame generating unit transmits the meter data frame to which number of alternate routing that indicates number of allowable transmission attempts from a data communication apparatus adjacent to a destination gateway of the meter data frame to the gateway is added. The frame transferring unit changes the number of alternate routing added thereto to a
(Continued)

value smaller by 1 than a value that has been set and transits the meter data frame to another data communication apparatus.

11 Claims, 7 Drawing Sheets

(51) Int. Cl.
*H04W 84/22* (2009.01)
*H04W 4/04* (2009.01)
*H04L 12/703* (2013.01)
*H04L 29/08* (2006.01)
*H04W 84/18* (2009.01)

(52) U.S. Cl.
CPC .............. *H04W 84/22* (2013.01); *H04L 67/12* (2013.01); *H04W 84/18* (2013.01)

(58) Field of Classification Search
CPC . H04L 41/0668; H04L 41/0672; H04B 10/03; H04B 10/032; H04B 10/035; H04B 10/038; H04J 14/0287; H04J 14/0289; H04J 14/029; H04J 14/0291; H04J 14/0293; H04J 14/0294; H04J 14/0295; H04J 14/0297; H04J 2203/006; H04W 84/22; H04W 40/34
See application file for complete search history.

(56) References Cited

U.S. PATENT DOCUMENTS

| | | | |
|---|---|---|---|
| 2009/0034419 A1* | 2/2009 | Flammer, III | H04L 45/124 370/238 |
| 2010/0150072 A1 | 6/2010 | Ishii et al. | |
| 2010/0195560 A1 | 8/2010 | Nozaki et al. | |
| 2011/0298634 A1* | 12/2011 | Beverung | H04Q 9/00 340/870.02 |
| 2012/0051212 A1* | 3/2012 | Xu | H04L 41/0659 370/223 |
| 2012/0106552 A1 | 5/2012 | Iwao et al. | |

OTHER PUBLICATIONS

International Search Report mailed Apr. 2, 2013, in corresponding International Patent Application No. PCT/JP2013/055849.

* cited by examiner

FIG.4

| GW-ID | OPERATING STATE | COMMUNI-CATION WITH HIGHER-LEVEL DEVICE | SELECTION STATE | LATEST GW ADVERTISEMENT RECEPTION TIME | ... |
|---|---|---|---|---|---|
| G01 | ABNORMAL | ABNORMAL | - | 20xx/01/11 10:30 | ... |
| G02 | NORMAL | NORMAL | IN USE | 20xx/01/11 10:33 | ... |
| G03 | ABNORMAL | UNKNOWN | - | 20xx/01/11 7:01 | ... |
| G04 | NORMAL | NORMAL | BACKUP | 20xx/01/11 10:31 | ... |
| ... | ... | ... | ... | ... | ... |

FIG.5

| DESTINATION CANDIDATE | ADJACENT NODE ID | NUMBER OF HOPS TO DESTINATION | ... |
|---|---|---|---|
| G01 | G01 | 1 | ... |
| | N2 | 2 | ... |
| | N10 | 4 | ... |
| | N11 | 5 | ... |
| G02 | N2 | 8 | ... |
| | N10 | 6 | ... |
| | N11 | 5 | ... |
| G03 | N2 | ... | ... |
| | N10 | ... | ... |
| | N11 | ... | ... |
| ... | ... | ... | ... |

FIG.6

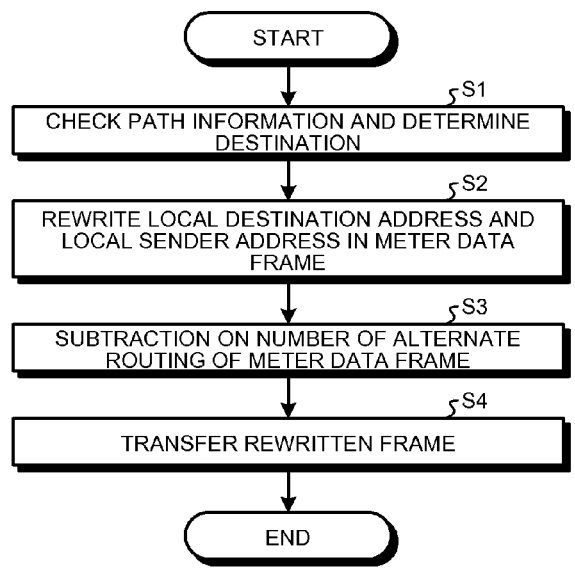

FIG.7

| GLOBAL DESTINATION ADDRESS | GLOBAL SENDER ADDRESS | LOCAL DESTINATION ADDRESS | LOCAL SENDER ADDRESS | FRAME IDENTIFICATION INFORMATION | NUMBER OF ALTERNATE ROUTING | ... |

METER DATA FRAME RECEIVED FROM NODE $3_{11}$

| GATEWAY 2A | NODE $3_{11}$ | NODE $3_1$ | NODE $3_{11}$ | IDENTIFICATION INFORMATION | 3 | ... |

MODIFIED METER DATA FRAME REWRITTEN AT STEP S3

| GATEWAY 2A | NODE $3_{11}$ | NODE $3_2$ | NODE $3_1$ | IDENTIFICATION INFORMATION | 2 | ... |

FIG.8

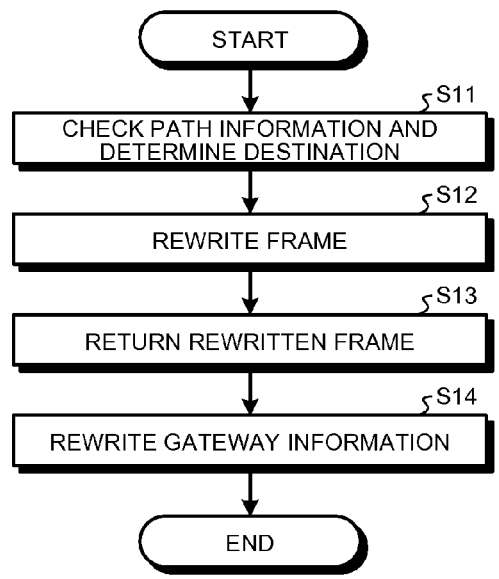

FIG.9

| GLOBAL DESTINATION ADDRESS | GLOBAL SENDER ADDRESS | LOCAL DESTINATION ADDRESS | LOCAL SENDER ADDRESS | FRAME IDENTIFICATION INFORMATION | NUMBER OF ALTERNATE ROUTING | ... |
|---|---|---|---|---|---|---|

METER DATA FRAME TRANSMITTED TO GATEWAY 2A FROM NODE $3_4$

| GATEWAY 2A | NODE $3_{11}$ | GATEWAY 2A | NODE $3_4$ | IDENTIFICATION INFORMATION | 0 | ... |
|---|---|---|---|---|---|---|

MODIFIED METER DATA FRAME REWRITTEN AT STEP S12

| GATEWAY 2A | NODE $3_{11}$ | NODE $3_3$ | NODE $3_4$ | IDENTIFICATION INFORMATION | 0 | ... |
|---|---|---|---|---|---|---|

DATA COMMUNICATION APPARATUS, DATA COMMUNICATION SYSTEM, AND DATA COMMUNICATION METHOD

CROSS-REFERENCE TO RELATED APPLICATIONS

This application is a continuation of International Application No. PCT/JP2013/055849, filed on Mar. 4, 2013, which is based upon and claims the foreign priority benefit Japanese Patent Application No. 2012-053830, filed on Mar. 9, 2012, the entire contents of which are incorporated herein by reference.

BACKGROUND

1. Field

The embodiments discussed herein are related to a data communication apparatus, a data communication system, and a data communication method that are applied to a system that automatically reads a usage amount of electricity or the like.

2. Description of Related Art

In recent years, a form of applying an ad hoc communication in which a plurality of wireless stations mutually communicate wirelessly and perform multihop communication to establish a network, as a network infrastructure of automatic meter-reading for electricity or the like has been proposed. By applying the ad hoc communication, it is aimed to provide an automated meter-reading system that covers a wide range of areas while keeping cost of facilities low (for example, TAKAHASHI, Yuji, et al., "Network Technology Supporting an Intelligent Society: WisReed", the FUJITSU magazine, FUJITSU LIMITED, Vol. 62, No. 3, pp. 348-355, September, 2011).

As a related wireless station that performs the ad hoc communication, a node device that is described in Japanese Patent No. 4820464 has been available. This node device is configured to be able to select an appropriate path even if a network topology has not been identified. This node device determines, when transmitting (including transfer) a frame addressed to a certain node device, which one among adjacent nodes (node devices positioned adjacently) the frame is to be transmitted, based on priority of each adjacent node prescribed for each destination of the frame, and transmits the frame to the determined node. Moreover, when transmission fails, a new transmission destination is determined from among remaining adjacent nodes excluding the adjacent node for which the transmission has failed. In transfer operation of a frame received from an adjacent node, when transmission fails even if transfer to all adjacent nodes excluding the adjacent node of the source of the received frame has been attempted, that is, when no path to a destination node is present, the frame is returned to the adjacent node of the source.

The node device disclosed in Japanese Patent No. 4820464, as described, attempts transmission/transfer of a frame to all adjacent nodes at the time of transmission or transfer of a frame. In transfer, when transmission to all adjacent nodes fails (when no path to a destination node is present), the frame is returned to a preceding node (source node), and the preceding node attempts retransmission/transfer of the frame to other paths. However, if the operation to return a frame to a preceding node increases, a problem arises that time in which the frame stays on the network increases.

Furthermore, when a destination node has a failure, or when all nodes adjacent to the destination node have a failure, although it is in a state in which a path to the destination node is not available, transfer of the frame among nodes around the node having a failure and transmission of the frame to the node having a failure are repeatedly performed. As a result, a problem arises that useless frame transmission occurs to consume communication resources unnecessarily.

SUMMARY

According to an aspect of the embodiments, a data communication apparatus forms a mesh network together with at least one gateway and includes a frame generating unit that generates a meter data frame to transmit to a gateway, the meter data frame being a frame including meter data; and a frame transferring unit that transfers the meter data frame received from another data communication apparatus, the meter data frame being addressed to the gateway, wherein the frame generating unit transmits the meter data frame to which number of alternate routing that indicates number of allowable transmission attempts from a data communication apparatus adjacent to a destination gateway of the meter data frame to the gateway is added, and the frame transferring unit, when transmission of the meter data frame to the adjacent gateway fails and the number of alternate routing added to the meter data frame is 1 or more, changes the number of alternate routing added thereto to a value smaller by 1 than a value that has been set and transits the meter data frame to another data communication apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

The invention will be explained in greater detail below with reference to exemplary embodiments in conjunction with the figures in the drawing, in which:

FIG. 4 is a table indicating an example of gateway information that is retained by the node;

FIG. 5 is a table indicating an example of path information;

FIG. 6 is a flowchart of an example of alternate routing operation of the meter data frame;

FIG. 7 indicates an example of rewriting operation of the meter data frame in the alternate routing operation;

FIG. 8 is a flowchart of an example of return operation of the meter data frame;

FIG. 9 indicates an example of rewriting operation of the meter data frame in the return operation;

DESCRIPTION OF EMBODIMENTS

Preferred embodiments will be explained with reference to accompanying drawings. The present invention is not limited to the embodiments.

[a] First Embodiment

Figure 1:
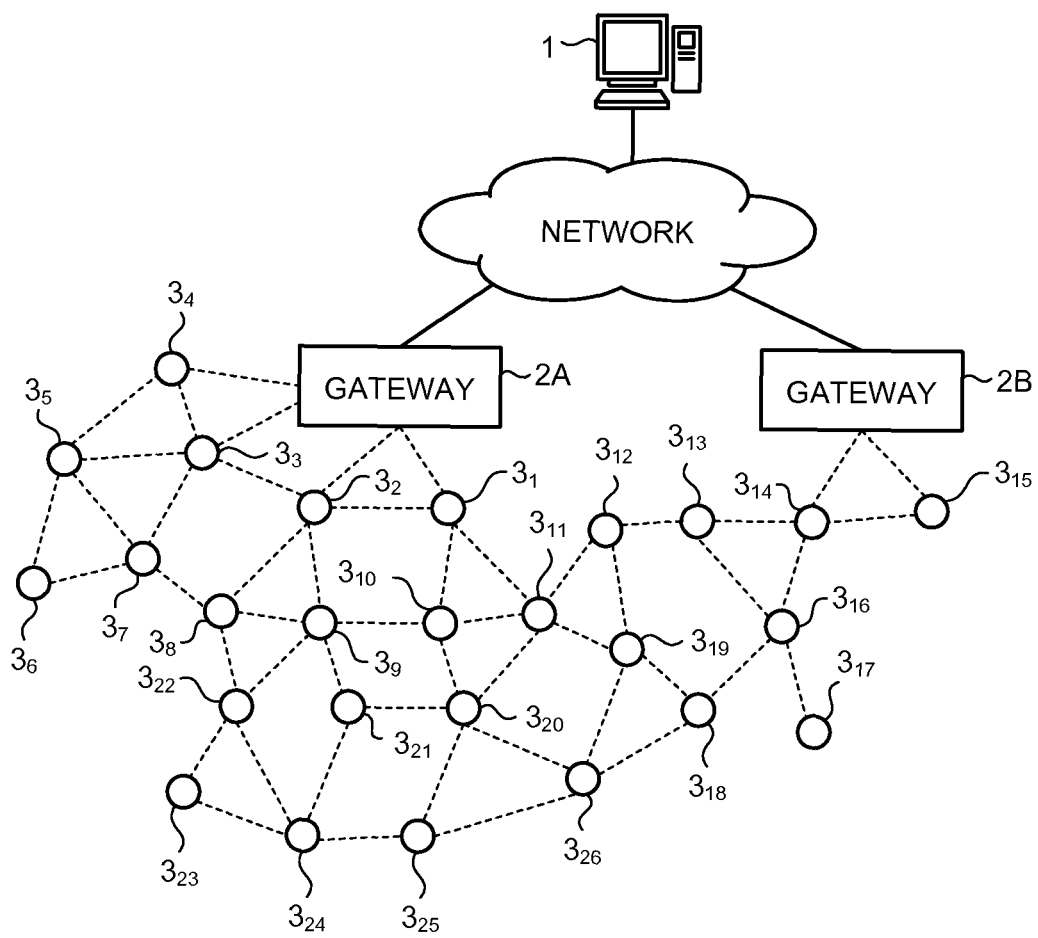
FIG. 1 is a schematic diagram indicating a configuration example of an automated meter-reading system that is implemented by applying a data communication apparatus according to the present invention.

FIG. 1 is a schematic diagram indicating a configuration example of an automated meter-reading system that is implemented by applying the data communication apparatus according to the present invention. An automated meter-reading system illustrated in FIG. 1 includes a data collecting server 1, gateways 2A and 2B, and wireless stations (hereinafter, "nodes") 31 to 326 that are the data communication apparatuses. The nodes 31 to 326 are meter-reading devices that are installed, for example, at customer sites, that measure electricity with a sensor function equipped in each node, and that regularly transmit meter data to the data collecting server 1. Alternatively, it may be configured such that meter data is acquired from an external electricity meter to transmit to the data collecting server 1 instead of measuring electricity by the sensor function of each node.

The nodes 31 to 326 form an ad hoc network that is the data communication system according to the present invention together with the gateways 2A and 2B. In FIG. 1, broken lines connecting wireless communication devices (the gateways 2A to 2B, and the nodes 31 to 326) indicate links of the wireless communication, and wireless communication devices at both ends of each broken line are in adjacent relationship and are enabled to communicate directly with each other. For example, to the node 31, the gateway 2A, the node 32, the node 310, and the node 311 are adjacent, and these devices and the node 31 can communicate with each other directly. Although two units of the gateways 2A and 2B are illustrated in FIG. 1, the number of the gateways may be other than two units. It may be one unit or three units. Moreover, in the following explanation, when it is not necessary to distinguish the nodes 31 to 326, these nodes are collectively described as the node 3.

The data collecting server 1 is connected to a network, and collects the meter data that is transmitted from each of the nodes 3 through the gateway 2A or 2B that are connected to the network as well. The form of connection of the data collecting server 1 and the respective gateways does not matter. It may be configured such that the respective gateways are connected directly to the data collecting server 1, not through a network. Furthermore, the respective gateways and the data collecting server 1 may be connected by wire connection or wireless connection.

The gateways 2A and 2B receive the meter data (frame) that is transmitted from the node 3, transfer to the data collecting server 1, and registers the node 3 as a subordinate node. The transfer of the meter data may be performed at each reception of data, or may be performed such that meter data received from the node 3 during a predetermined period is transferred collectively at a time. Moreover, when a frame that is transmitted from the data collecting server 1 or the like to the node 3 is received from the network, the gateways 2A and 2B determine whether the node 3 of the destination is the node 3 of a subordinate node thereof, and when determined a subordinate node, transfers the frame to the node 3 of the destination.

Figures 2, 3:
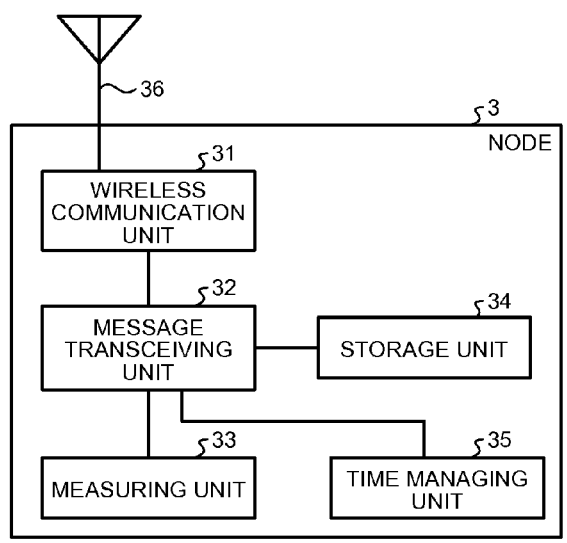
FIG. 2 is a block diagram indicating a configuration example of a node.
FIG. 3 indicates a configuration example of a frame (meter data frame) to transmit meter data.

FIG. 2 is a block diagram indicating a configuration example of the node 3. As illustrated in FIG. 2, the node 3 includes a wireless communication unit 31, a message transceiving unit 32, a measuring unit 33, a storage unit 34, a time managing unit 35, and an antenna 36.

In the node 3, the wireless communication unit 31 transmits and receives a frame by wireless communication to and from the other wireless communication devices (the node 3, the gateways 2A, 2B) through the antenna 36.

The message transceiving unit 32 functioning as a frame generating unit and a frame transferring unit performs processing of converting control information, data measured by the measuring unit 33, and the like into a message to transmit to the data collecting server 1, processing of receiving a message transmitted from the data collecting server 1 or the other wireless communication device, and processing of transferring a received message.

The measuring unit 33 measures an electricity usage amount at a consumer site of installation. In addition to the electricity usage amount, data (temperature, humidity, and the like) that is requested by the data collecting server 1 may also be measured.

The storage unit 34 stores various kinds of information such as information about the other nodes 3 adjacent thereto (adjacent nodes), information about connectable gateways, a result of measurement by the measuring unit 33, and the like.

The time managing unit 35 manages local time that is a time held in the node 3. Note that the time is synchronized among the nodes 3 forming a network and the node 3 and the gateways, and transmission and reception of frames to maintain the time synchronization are performed at predetermined timing within the mesh network.

Operation of the automated meter-reading system configured as describe above is explained in detail. First, operation of the gateways 2A and 2B and operation of the node 3 are explained, and thereafter, detailed operation when the node 3 transmits meter data is explained. In each explanation of the operation, only main operation related to the present invention is explained, and explanation of other general operation is omitted.

Main Operation of Gateways 2A and 2B

Because the operation of the gateway 2A and the gateway 2B is the same, the operation of the gateway 2A is explained.

The gateway 2A broadcasts a gateway (GW) advertisement periodically on a specific channel, to inform the presence of itself, an operating state, and the like to the nodes 3 therearound. The GW advertisement includes at least identification information (GW-ID) of a source gateway and information about a communication state between the source gateway and the data collecting server 1 (that is, information about whether communication with the data collecting server 1 is normally performed). The gateway 2A monitors the communication state with the data collecting server 1 by a predetermined method. The number of the nodes 3 (the number of connected nodes) that select themselves as a transmission destination of meter data may be included in the GW advertisement. The number of the connected nodes is obtained, for example, by monitoring meter data (frame) that is periodically transmitted to the data collecting server 1 from the nodes 3 for a predetermined period of time. Furthermore, the gateway 2A periodically broadcasts a presence informing frame described later.

Main Operation of Node 3

Each of the nodes 3 in the system monitors the GW advertisement that is transmitted from the gateway, to grasp a gateway that is in a state in which multihop communication is enabled. Furthermore, the node 3 periodically broadcasts the presence informing frame that includes information about the node 3 itself (identification information and the like) so that the other nodes 3 can grasp the presence of the node 3. The node 3 can grasp the adjacent nodes that are present therearound (the other nodes 3 with which direct communication is possible) by receiving the presence informing frame. Furthermore, the node 3 measures an electricity usage amount at a consumer site, and periodically transmits a frame including meter data that is a measurement result to the gateway 2A or 2B. The transmission timing is specified by a gateway, for example, by the GW advertisement.

FIG. 3 indicates a configuration example of a frame (hereinafter, "meter data frame") to transmit meter data. The meter data frame includes, as control information, a "global destination address", a "global sender address", a "local destination address", a "local sender address", "frame identification information", and "number of alternate routing". Although illustration is omitted, meter data is stored in a payload.

The "global destination address" indicates an address of a device that is the final destination of the meter data frame, and in the case of the structure indicated in FIG. 1, the address of the gateway 2A or 2B is set therein. In the "global sender address", an address of the node 3 that first transmits the meter data frame, that is, the node 3 that has acquired a meter data to be transmitted in the meter data frame, is set. In the "local destination address", an address of either one of the adjacent nodes that is the direct transmission destination (following transmission destination) of the meter data frame is set. In the "local sender address", an address of the node 3 that transmits or transfers the meter data frame is set.

The global destination address and the global sender address are invariant. On the other hand, the local destination address and the local sender address are updated each time the meter data frame is transferred. For example, when the node 311 transmits a meter data frame to the gateway 2A through the node 31, the node 311 sets the address of the gateway 2A in the global destination address, the address of itself in the global sender address, the address of the node 31 in the local destination address, and the address of itself in the local sender address, to transmit. This frame is received by the node 31, and the node 31 changes the local destination address of the received meter data frame to the address of the gateway 2A and changes the local sender address to the address of itself, to transfer to the gateway 2A.

The "frame identification information" is information that uniquely indicates a frame, and the node 3, the gateways 2A and 2B that receive the frame determines whether the same frame has been received by checking this information.

The "number of alternate routing" is information that is used in control to achieve prevention of the meter data frame staying on a network for long time and prevention of unnecessary frame transmission. Although the detailed use is explained later, this number of alternate routing is updated when the node 3 that is adjacent to a gateway that is indicated as the global destination address of a meter data frame fails transmission of the frame to the gateway. For example, when transmission of a meter data frame from the node 31 to the gateway 2A fails, the node 31 subtracts 1 from the number of alternate routing that has been set in the meter data frame. Note that only when transmission from the node 3 to the getaway 2A or 2B fails, the number of alternate routing is changed to a number smaller by 1 than the number that has been set. That is, when transmission of a meter data frame in which the same value is set in the global destination address and the local destination address fails, the number of alternate routing is changed. This number of alternate routing indicates how many times more transmission of a meter data frame in which the same value is set in the global destination address and the local destination address is allowed to be attempted.

FIG. 4 is a table indicating an example of gateway information that is held by the node 3. The node 3 has information about a connectable gateway (hereinafter, "gateway information"), and in the gateway information, the "GW-ID", "communication with higher-level device", an "operating state", a "selection state", and a "latest GW advertisement reception time" are included.

The "GW-ID" is identification information of a gateway.

The "communication with higher level device" is information that indicates whether communication between the gateway and a higher-level device (the data collecting server 1 in the preset embodiment) is normal. The node 3 can learn the communication state (whether communication is normally performed) between the gateway and the data collecting server 1 by checking the GW advertisement distributed by each gateway in the system. When the GW advertisement is unable to be received, it is to be "unknown".

The "operating state" is information that indicates whether a gateway is operating normally. The node 3 determines, when the GW advertisement or the presence informing frame that is supposed to be transmitted from a certain gateway is not received for a predetermined period, or when information of the "communication with higher-level device" included in the received GW advertisement indicates abnormal or unknown, that a trouble (a device failure, a power outage, and the like) has occurred in the gateway. When determined that a trouble has occurred, the operating state of the gateway that is determined to have a trouble is changed to "abnormal". Thereafter, when the GW advertisement in which the communication state with the higher-level device is normal is distributed from the gateway the "operating state" of which is "abnormal", the "operating state" is changed to "normal".

The "selection state" is information that indicates a gateway being the destination of a meter data frame and a backup gateway. The node 3 selects one among gateways the "operating state" and the "communication with higher-level device" of which are "normal" to be set as "in use", and the remaining one as "backup". Which gateway is to be set as "in use" when there is more than one candidate to be selected is determined based on the number of hops to a gateway, the communication quality on a path to a gateway, or the like. When selecting based on the number of hops, for example, one having the smaller number of hops has higher priority to be selected. When selecting based on the communication quality, for example, one having the highest transmission success rate in a past predetermined period has higher priority to be selected. It may be configured such that a gateway to be in use is successively switched each time transmission fails. Selection may be made based on more than one kind of information such as the number of hops and the communication quality.

The "latest GW advertisement reception time" indicates a time when the GW advertisement is received most recently. As already explained, this information is used to determine the operating state of a gateway.

As described, the gateway information is information that is generated or updated by receiving the GW advertisement that is distributed by each gateway in the system. When the GW advertisement is received, the node 3 determines whether it is necessary to transfer this GW advertisement, and when it is necessary to transfer, transfers the GW advertisement by broadcasting. Determination whether it is necessary to transfer is made based on, for example, a time to live (TTL) value that is changed at each transfer. At this time, when the GW advertisement having the same contents as the one already transferred is received again, transfer is not performed regardless of the TTL value.

Moreover, the node 3 holds information indicated in FIG. 5 as path information to be referred to when transmitting a meter data frame (refer to FIG. 3). That is, the path information including a "destination candidate", an "adjacent node ID", and the "number of hops to destination" is held. The path information indicated in FIG. 5 corresponds to the one held by the node 31 illustrated in FIG. 1.

The "destination candidate" is identification information (for example, address) of a gateway being a candidate to be set as the global destination address of the meter data frame. The node 3 determines, when receiving the GW advertisement, whether a gateway of the source has been registered as a destination candidate, and if the gateway has not been registered, registers the gateway.

The "adjacent node ID" is identification information (for example, address) of an adjacent node, and indicates a list of adjacent nodes selectable as a destination (direct transmission destination) when a meter data frame in which the global destination address is set to identification information (for example, address) that is indicated in the "destination candidate" to the left thereof. When direct communication with a gateway is possible, identification information of the gateway is also held as the adjacent node ID. "G01" listed on the top in FIG. 5 corresponds to identification information of a gateway. The node 3 registers identification information of an adjacent node (the other node 3 or a gateway) that has transmitted the GW advertisement or the presence informing frame to itself as the adjacent node ID. The node 3 can receive, from a plurality of adjacent nodes, the GW advertisement or the presence informing frame that is transmitted from one gateway. When the GW advertisement or the presence informing frame is received from a node other than the adjacent nodes the identification information of which has been registered in the adjacent node ID, identification information of an adjacent node that has transferred the received GW advertisement or presence informing frame to itself is registered as the adjacent node ID associating with the gateway (destination candidate) that has transmitted the GW advertisement.

The "number of hops to destination" indicates, when the node 3 corresponding to the "adjacent node ID" listed next thereto on the left is selected as the destination of a frame, the number of hops to a gateway indicated in the "destination candidate" listed next thereto on the left. The number of hops can be acquired from the GW advertisement that is distributed from each gateway. The information on the number of transfer is included in the GW advertisement, and each of the nodes 3 updates the number of transfer when transferring the GW advertisement, thereby enabling acquisition of the number of hops.

The structure of the path information indicated in FIG. 5 is one example, and any structure is applicable as long as information requested when transmitting/transferring a meter data frame can be managed.

Transmission Operation of Meter Data by Node 3

Next, transmission/transfer operation of meter data (meter data frame) performed by the node 3 is explained with a specific example. Herein, as one example, a case in which the node 311 illustrated in FIG. 1 transmits meter data is explained. Suppose the node 311 selects the gateway 2A as the destination of the meter data in the initial state.

Operation in Normal State

The node 311 monitors whether transmission time of the meter data has come, and when the transmission time has come, generates a meter data frame to transmit to the gateway 2A. That is, when the transmission time of a meter data frame has come, the message transceiving unit 32 (refer to FIG. 2) of the node 311 acquires measurement data from the measuring unit 33 and generates a meter data frame (refer to FIG. 3). At this time, first, the gateway information (refer to FIG. 4) stored in the storage unit 34 is referred, and finds a gateway the selection state is "in use". Herein, explanation is continued supposing that the gateway 2A is "in use". The message transceiving unit 32 next refers to the path information (refer to FIG. 5) stored in the storage unit 34, and selects an adjacent node (local destination) to which the meter data frame is directly transmitted. Herein, explanation is continued supposing that the node 31 that ha the smallest number of hops to the gateway 2A is selected. When selection of the local destination is completed, the address of the gateway 2A is set in the global destination address, the address of the node 31 is set in the local destination address, and the address of itself (node 311) is set in the local sender address of the meter data frame. Furthermore, in the number of alternate routing, the largest number of routing operation (details are explained later) performed when transfer fails is set. In this example, "3" is set therein.

The node 31 that has received the meter data frame transmitted from the node 311 checks the global destination address of the meter data frame and determines the transfer destination (direct transmission destination). Determination of a transfer destination is performed based on the path information (refer to FIG. 4 and FIG. 5). Herein, explanation is continued supposing that the gateway 2A is determined as the transfer destination. The node 31, when the gateway 2A is determined as the transfer destination, changes the local destination address of the meter data frame received from the node 311 to the gateway 2A, and also changes the local sender address to the address of itself. Determination of a transfer destination and change of the local destination address and the local sender address are performed by the message transceiving unit 32 of the node 31. The message transceiving unit 32 of the node 31, when change of the addresses is completed, transmits the meter data frame to the gateway 2A.

The gateway 2A, when the meter data frame is received normally, acquires the meter data and transmits to the data collecting server 1 after re-framing or the like is performed as necessary.

Operation in Abnormal State

Next, operation when the gateway 2A cannot receive a meter data frame that is transmitted to the gateway 2A by the node 311 due to a device failure, a communication failure, or the like is explained.

The transmission operation of a meter data frame performed by the node 311 and the transfer operation of a meter data frame to the gateway 2A by the node 31 are the same as the above (operation in a normal state). However, it is supposed that the gateway 2A is in a state in which a meter data frame transferred by the node 31 cannot be received normally.

The node 31, when detecting that the gateway 2A cannot receive a transferred meter data frame, determines whether it is necessary to transmit (whether it is necessary to perform alternate routing) the meter data frame to the gateway 2A through the other node 3 (alternate path) adjacent thereto. The number of alternate routing set in the meter data frame that is received from the node 311 is checked, and when the number of alternate routing is 1 or more, it is determined to be necessary to perform alternate routing. When alternate routing is necessary, alternate routing operation is started. Specifically, following a flow indicated in FIG. 6, the path information is checked and an adjacent node to be the transfer destination (alternate destination) is determined (step S1). Herein, explanation is continued supposing that alternate routing is necessary and the node 32 is determined as the alternate destination. When the node 32 is determined as the alternate destination, the node 31 changes the local destination address of the meter data frame received from the node 311 to the node 32, and also changes the local sender address to the address of itself (step S2). Moreover, 1 is subtracted from the number of alternate routing (changed from 3 to 2) (step S3), and the meter data frame after the change is transferred (step S4).

FIG. 7 is a diagram relating to the rewriting operation of meter data frame performed at steps S2 and S3 in FIG. 6. At step S2, the node 3 sets the local destination address to the address of the node 32 that is the transfer destination determined at step S1, and the local sender address to the address of itself. Moreover, at step S3, the node 31 sets a value that is obtained by subtracting 1 from the number of alternate routing. The modified meter data frame set as described above is transferred at step S4.

The node 32 that has received the meter data frame transferred by the node 31 checks the global destination of the meter data frame to determine a transfer destination. Herein, explanation is continued supposing that the gateway 2A is determined as the transfer destination. Determining the gateway 2A as the transfer destination, the node 32 changes the local destination address of the received meter data frame to the gateway 2A and the local sender address to the address of itself, to transmit to the gateway 2A. When the gateway 2A succeeds in receiving this meter data frame normally, the operation is finished at this point. On the other hand, when normal reception is not possible, the node 32 transfers the meter data frame to another one of the nodes 3 (alternate routing) as necessary.

That is, when detecting that the gateway 2A cannot receive the transferred meter data frame, the node 32 determines the necessity of alternate routing by determining whether the number of alternate routing of the meter data frame received from the node 31 is 1 or more, and when alternate routing is necessary, further checks the path information to determine an adjacent node to be the destination of alternate routing. Herein, explanation is continued supposing that alternate routing is necessary and the node 33 is determined as the destination of alternate routing. Determining the destination of alternate routing as the node 33, the node 32 changes the local destination address of the meter data frame received from the node 31 to the node 33 and the local sender address to the address of itself. Furthermore, the node 32 subtracts 1 from the number of alternate routing (changes from 2 to 1), and transfers the modified meter data frame.

The node 33 that receives the meter data frame transferred by the node 32 performs the same operation as the node 32 that receives the meter data frame transferred by the node 31, and further performs alternate routing of the meter data frame as necessary. Herein, explanation is continued supposing that alternate routing is further performed to the node 34. The number of alternate routing of the meter data frame transmitted to the node 34 by the node 33 is 0.

The node 34 that receives the meter data frame transferred by the node 33 checks the global destination of the meter data frame to determine the transfer destination. Herein, explanation is continued supposing that the gateway 2A is determined as the transfer destination. Determining the gateway 2A as the transfer destination, the node 34 changes the local destination address of the received meter data frame to the gateway 2A and the local sender address to the address of itself, to transmit to the gateway 2A. When the gateway 2A cannot receive this meter data frame normally, the node 34 determines the necessity of alternate routing; however, because the number of alternate routing is 0, further alternate routing is not performed. In this case, the node 34 performs an operation following a flow indicated in FIG. 8 (return operation). That is, the node 34 checks the path information to determine the source node (in this case, the node 33) (step S11), and changes the local destination address of the meter data frame to the node 33, while leaving the number of alternate routing as 0 (step S12). Thereafter, the modified meter data frame is returned (step S13). Furthermore, the node 34 determines that the gateway corresponding to the global destination address set in the meter data frame is not normally operating on condition that the number of alternate routing of the returned meter data frame is 0, and updates corresponding parts in the gateway information indicated in FIG. 4 (step S14). That is, the "operating state" of the gateway determined that normal operation is not enabled is changed to "abnormal" (in FIG. 4, the operating state of G02 selected as "in use" is changed to "abnormal"). Thus, a gateway having high possibility that normal reception is not possible even if a meter data frame is transmitted thereto can be excluded from destination candidates at the time of transmitting a meter data frame that includes meter data measured by itself. Therefore, it is possible to prevent unnecessary transmission, and to reduce time in which a meter data frame stays on a network. When the GW advertisement indicating that the communication state with a higher-level device is normal is distributed from the gateway for which the "operating state" is set as "abnormal", the "operating state" is changed back to "normal".

FIG. 9 is a diagram related to the rewriting operation of a meter data frame performed at step S12 in FIG. 8. At step S12, the node 34 sets the local destination address to the address of the node 33 that is the transfer destination determined at step S11, and the local sender address to the address of itself. Moreover, the number of alternate routing is left as 0. The modified meter data frame set as described above is returned at step S13.

The node 33 that receives the meter data frame returned by the node 34 returns the meter data frame to the node 32 that is the source thereof when this meter data frame is first received. At this time, the number of alternate routing is not changed. Furthermore, node 33 determines that the gateway corresponding to the set global address is not operating normally, and updates corresponding parts in the gateway information held thereby. Thereafter, the meter data frame that is not received by the gateway 2A normally reaches the source node 311 through respective nodes (the node 32 and the node 31) on the path through which transmission is performed initially. The operation of the node 32 and the node 31 when returning the meter data frame is the same as the return operation by the node 34.

Each of the nodes determines the adjacent node to be the destination of the frame based on the communication quality, or when it is configured such that the priority (likeliness to be selected) of destination candidates is updated according to the communication quality, the stored communication quality is not updated at the time of return operation of the meter data frame.

The node 311 that has first transmitted the meter data frame to the gateway 2A determines that transmission has failed when this frame is returned, and determines whether a destination candidate gateway (gateway the "selection state" in the gateway information of which is "backup") is present other than the gateway 2A, and when another destination candidate is present, retransmits the meter data frame to the gateway of the other destination candidate. Whether another destination candidate is present is determined by checking the gateway information (FIG. 4) held thereby. For example, if the gateway 2B is operating normally, the global destination address of the returned meter data frame described above is changed to the address of the gateway 2B, and the number of alternate routing is initialized (changed back to 3) to retransmit the meter data frame. Furthermore, the gateway information held thereby is updated and the "operating state" of the gateway set as the destination of the returned meter data frame is changed to "abnormal".

When the meter data frame that has been retransmitted to the gateway 2A is also returned, it is determined whether another destination candidate is present again. If another destination candidate is present, the meter data frame is retransmitted to the destination candidate. Thereafter, the same processing is repeated.

Figure 10:
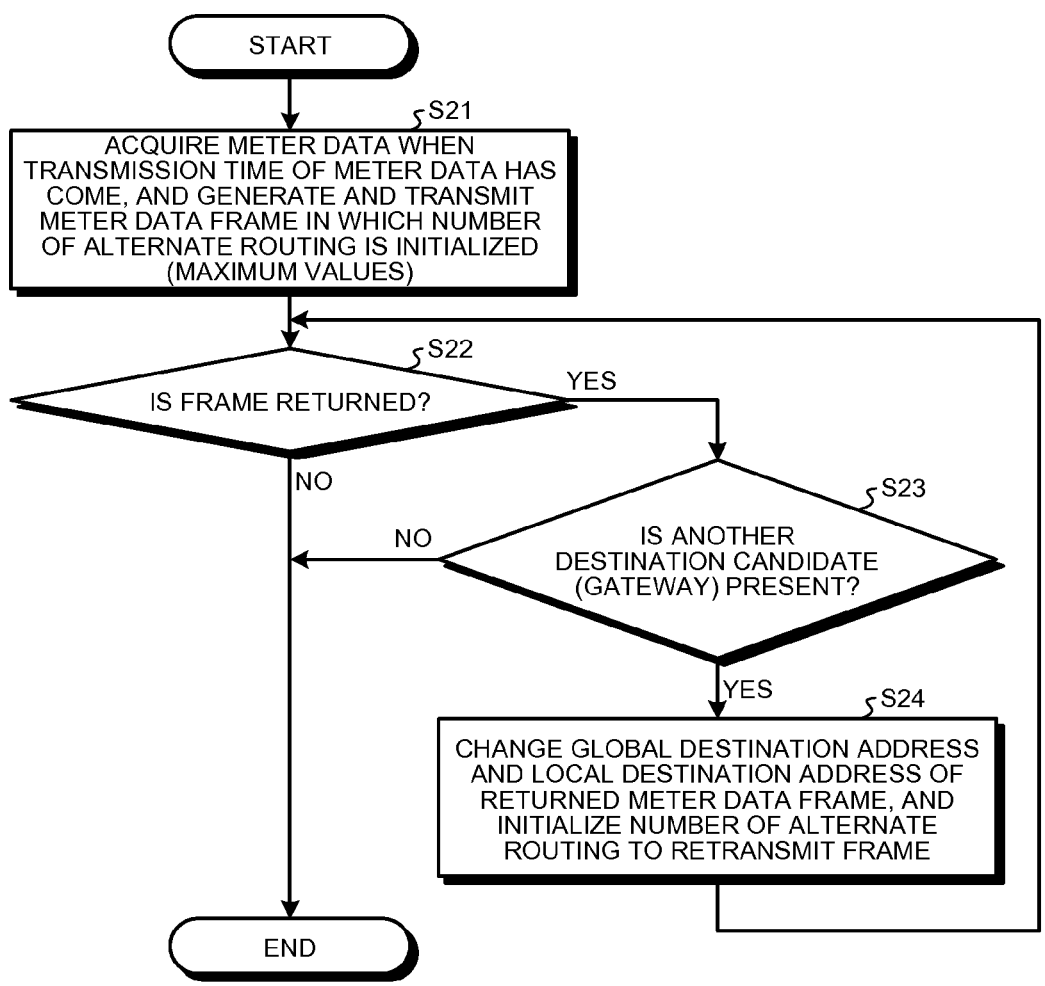
FIG. 10 is a flowchart of an example of operation of a node that is not adjacent to a gateway.

As described, in the automated meter-reading system of the present embodiment, the first node 3 (for example, the node 311 in FIG. 1) that is not adjacent to a gateway acquires, as indicated in FIG. 10, meter data when a meter data transmission time has come, generates and transmits a meter data frame in which an initial value is set in the number of alternate routing (step S21), and if the meter data frame is not returned, the operation is finished (step S22: NO). When the meter data frame is returned (step S22: YES), it is determined whether a gateway to be another destination candidate of the meter data frame is present (step S23), and when another destination candidate is present (step S23: YES), the global destination address of the meter data frame is changed to the address of the gateway to be the other destination candidate, and the local destination address is changed to the address corresponding to the global destination address after the change (address of an adjacent node), to retransmit the meter data frame while initializing the number of alternate routing (step S24). When another destination candidate (gateway) is not present (step S23: NO), the operation is ended.

Figure 11:
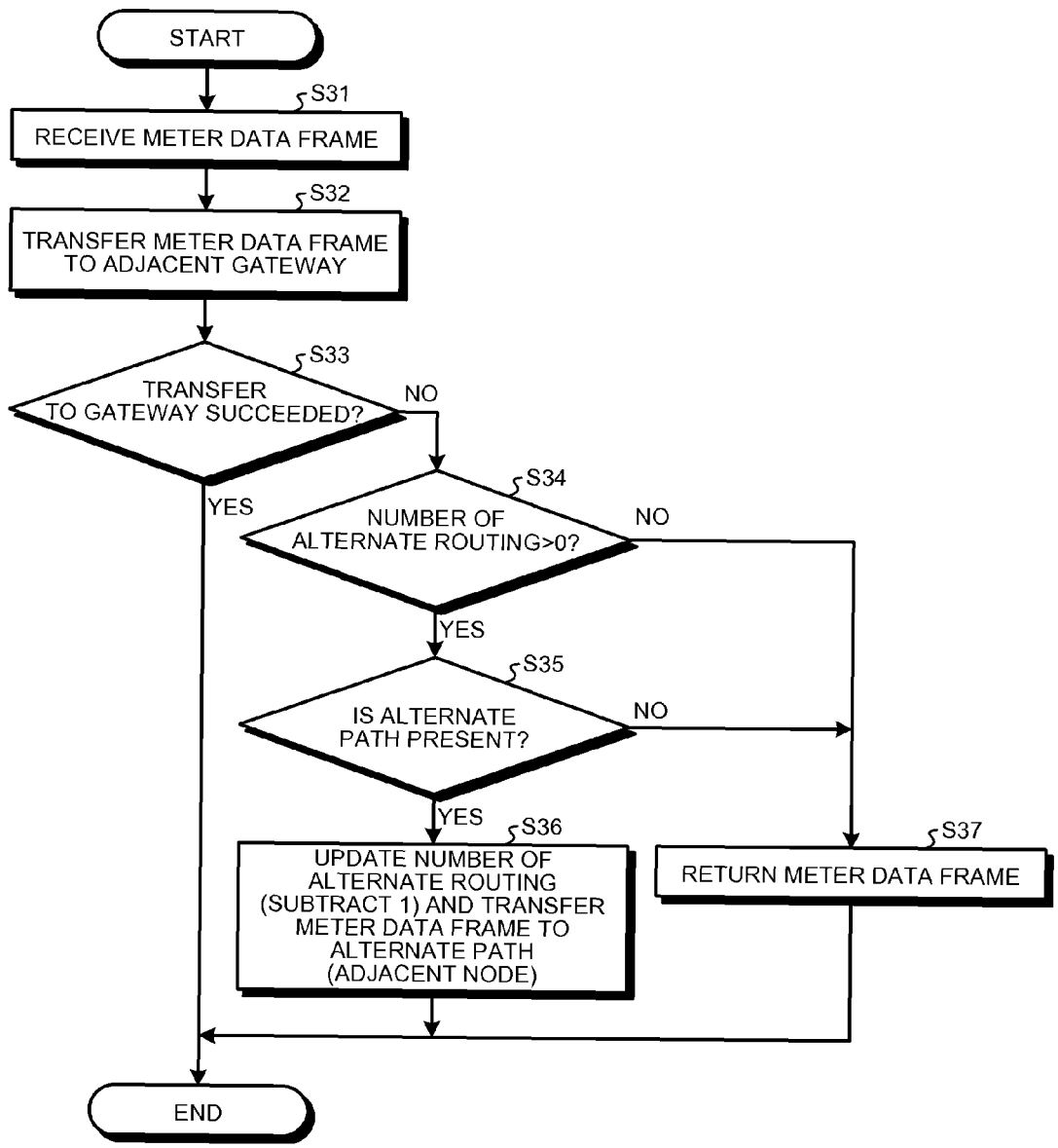
FIG. 11 is a flowchart of an example of operation of a node that is adjacent to the gateway.

On the other hand, when receiving the meter data frame, the second node 3 (for example, the node 32 in FIG. 1) adjacent to the gateway performs the operation according to FIG. 11. That is, when the meter data frame is received (step S31), the meter data frame is transferred to the adjacent gateway (step S32). When transfer to the gateway succeeds, the operation is ended (step S33: YES). If transfer fails (step S33: NO), it is determined whether the number of alternate routing of the meter data frame received at step S31 is other than 0 (positive integer) (step S34). When it is other than 0 (step S34: YES), it is determined whether an alternate path is available (step S35). When an alternate path is available (step S35: YES), the number of alternate routing of the meter data frame is updated (subtracts 1), and the meter data frame is transferred to the adjacent node on the alternate path (step S36). When the number of alternate routing described above is 0 (step: NO), the meter data frame is returned (step S37).

When receiving the meter data frame the number of alternate routing of which is 0, the node 3 performs transfer (return) thereof to the address of the node 3 that is set in the global sender address (without changing the number of alternate routing).

As described, in the automated meter-reading system of the present embodiment, when a measurement result is transmitted to the collecting server, the number of alternate routing is set for the meter data frame including measurement data. Moreover, when a gateway cannot normally receive the meter data frame directly transmitted to the gateway, the number of alternate routing set in the meter data frame is checked, and when a value other than 0 is set therein, the meter data frame is transferred to another node (taking alternate path) while subtracting 1 from the set value. Thus, for example, it is possible to avoid, when a destination gateway has a failure, a node adjacent to the gateway endlessly repeats the operation of alternate routing. As a result, it is possible to suppress increase of the transfer delay time of a frame, and to prevent increase of time in which the frame stays on a network. Furthermore, it is possible to avoid unnecessary frame transmission.

Moreover, each node on a path through which a meter data frame the number of alternate routing of which is 0 is returned updates the holding gateway information in the return operation. Therefore, it is possible to avoid transmission of the frame to a gateway having high possibility of not being able to operate normally, and from this point also, it is possible to prevent increase of time in which the frame stays on a network, and to avoid unnecessary frame transmission.

Although a case in which a meter data frame to be transmitted to a gateway is received has been explained in the present embodiment, it is not limited to a frame addressed to a gateway, and the same control may also be performed on a frame addressed the node 3. That is, it may be configured such that a node that transmits a frame first sets the number of alternate routing, and each node changes the number of alternate routing of the frame (subtracting 1) if the number of alternate routing is 1 or more when transmission of the frame having the same set value in the global destination address and the local destination address, to transmit the frame to another path (alternate routing).

[b] Second Embodiment

While the operation when more than one gateway to be a destination candidate of a meter data frame is present has been explained in the first embodiment, operation when a single gateway is present as the destination candidate is explained in the present embodiment.

As already explained, a gateway periodically broadcasts the GW advertisement to inform the presence of itself and the communication state with the data collecting server 1 to the node 3. However, there is a possibility that the gateway stops due to power outage and the GW advertisement is not distributed.

On the other hand, the node 3 monitors reception of the GW advertisement, determines that the gateway has a failure when a predetermined period (first period) has passed since last reception of the GW advertisement, and suspends transmission of the meter data frame. At this time, the "operating state" in the gateway information described above is changed to "abnormal". However, the operation of receiving the GW advertisement is continued, and recovery of the gateway is monitored. Thus, unnecessary transmission of the meter data frame can be prevented, and when the gateway recovers, the recovery can be detected at an early stage. Moreover, the path information that is referred to when a frame addressed to a gateway that has been determined to have a failure is kept for a second period longer than the first period so that the network can be restored as soon as the gateway recovers. When the second period has passed, the path information is initialized, and the network is rebuilt. Even while transmission of a frame is suspended, measurement of power or the like is continued, and results of measurement are kept so as to be able to transmit the results when the network is restored.

As described, the node 3 detects a failure in a gateway based on a reception result of the GW advertisement, and when detecting the failure, suspends transmission of a meter data frame addressed to the gateway. Furthermore, until a predetermined period (the second period described above) passes after detection of a failure, the path information that is used at transmission of a frame addressed to the gateway is kept. Thus, unnecessary transmission of a frame can be prevented, and early recovery of a network can be expected when the gateway recovers. Moreover, it is possible to prevent delay in start of rebuilding operation of a network more than necessary as a result of waiting recovery even though recovery of the gateway cannot be expected. The node 3 holds meter data acquired while the GW advertisement cannot be received, and when the gateway recovers, converts the held meter data that has been unable to be transmitted into a frame to transmit.

The second embodiment can be implemented by itself without combining with the first embodiment, and even in that case also, early recovery of a network after gateway recovers can be expected.

[c] Third Embodiment

A third embodiment of the communication apparatus according to the present invention is explained in detail below. Herein, only points different from the first embodiment are explained, and explanation of points in common with the first embodiment is omitted.

In the first embodiment, the configuration in which subtraction is performed on the number of alternate routing based on alternate routing performed when transmission to the gateway 2A fails is described. In the third embodiment, it is configured such that when the node 31 determines that the operating state of the gateway 2A is abnormal, the node 31 immediately perform subtraction on the number of alternate routing without attempting transmission to the gateway 2A, and transmits to the node 32 (takes an alternate path).

The node 31 monitors whether the gateway 2A is operating normally based on the GW advertisement, the presence informing frame, or the like. When the gateway 2A has a failure, the node 31 does not receive the GW advertisement, the presence informing frame, or the like that is periodically transmitted, and thus, the abnormal state of the gateway 2A is detected. When the node 31 detects the abnormal state of the gateway 2A in a situation in which a path to the gateway 2A having first priority in the node 31 is a path in which direct transfer from the node 31 to the gateway 2A is performed, receiving a frame addressed to the gateway 2A, the node 31 does not perform direct transmission thereof to the gateway 2A, and performs alternate routing of, for example, transmitting to the gateway 2A through the node 32 from the node 31 while performing subtraction on the number of alternate routing.

Moreover, when it is configured to update the priority (likeliness to be selected) of transmission candidates according to the communication quality, it may be configured such that the communication quality held therein is not updated at the time of alternate routing of the meter data frame described above.

When the node 31 detects the abnormal state of the gateway 2A in a situation in which a path to the gateway 2A having first priority in the node 31 is not a path in which direct transfer from the node 31 to the gateway 2A is performed, receiving a frame addressed to the gateway 2A, transfer to the path having first priority is performed, and alternate routing is not performed. Furthermore, as for detection of an abnormal state, an abnormal state of a gateway can be detected, when the GW advertisement, the presence informing frame, or the like includes information indicating an abnormal state of a gateway and reception of the GW advertisement, the presence informing frame, or the like is enabled, and when information indicating an abnormal state of the gateway is included therein, the abnormal state of the gateway can be detected based on the information.

Such a configuration produces effects of enabling to suppress unnecessary transmission attempts of a frame to a gateway that is determined as abnormal beforehand, and of avoiding increase of time in which the frame stays on a network.

[d] Fourth Embodiment

A fourth embodiment of the communication apparatus according to the present invention is explained in detail below. Herein, only points different from the first embodiment are explained, and explanation of points in common with the first embodiment is omitted.

While in the third embodiment, a configuration in which the node 31 determines an abnormal state of a gateway based on a signal from the gateway 2A is described, in the fourth embodiment, a configuration in which the node 31 determines an abnormal state of the gateway 2A based on a result of a frame transmission attempt performed to the gateway 2A is described.

In the fourth embodiment, the node 31 receives a frame addressed to the gateway 2A, and transmits the frame to the gateway 2A. When transmission by the node 31 to the gateway 2A fails for a predetermined number of times, the node 31 determines that the gateway 2A is in an abnormal state.

Thereafter, the operation of the node 31 is the same as that of the third embodiment, and when a frame addressed to the gateway 2A is transferred, transmission to the gateway 2A is not attempted, and subtraction on the number of alternate routing is immediately performed, and transmission to the node 32 is performed (takes an alternate path).

Such a configuration produces effects of enabling to suppress unnecessary transmission attempts of a frame to a gateway that is determined as abnormal, and of avoiding increase of time in which the frame stays on a network. Moreover, such an effect is also produced that an abnormal state of a gateway is detected in shorter time compared to the case of the third embodiment in which an abnormal state is determined based on the GW advertisement, the presence informing frame, or the like that is periodically transmitted.

[e] Fifth Embodiment

A fifth embodiment of the communication apparatus according to the present invention is explained in detail below. Herein, only points different from the first embodiment are explained, and explanation of points in common with the first embodiment is omitted.

In the first embodiment, the configuration in which subtraction is performed on the number of alternate routing based on alternate routing performed when transmission to the gateway 2A fails is described. In the fifth embodiment, a form in which the number of alternate routing is subtracted when return to a node corresponding to the local sender address occurs on a path to the gateway 2A, and when the number of alternate routing becomes 0, return to a node corresponding to the global sender address is performed is explained.

When every transmission fails although one node has attempted transmission to the gateway 2A through more than one path, a frame is returned to a node that is indicated in the local sender address in the frame received by the node. When return to the node corresponding to this local sender address occurs, subtraction on the number of alternate routing is performed. In the case in which the value is 0 when subtraction is to be performed on the number of alternate routing, the frame is returned to a node corresponding to the global sender address through the node corresponding to the local sender address. Such a configuration suppresses increase of time in which a frame such as meter data stays on a network.

For the number of alternate routing described herein, it may be configured such that two independent counters, a counter indicated in the first embodiment that performs subtraction when transmission to the gateway 2A fails and alternate routing occurs, and a counter indicated in the fifth embodiment that performs subtraction when return to a node corresponding to the local sender address occurring on a path to the gateway 2A, or may be configured such that a single counter has both functions of the two. Moreover, although an example is given in which subtraction on the alternate routing is performed wherever on a relay path return to a node corresponding to the local sender address occurs in the present embodiment, a form in which subtraction on the number of alternate routing is performed only when return to a node corresponding to the local sender address in transmission to a gateway occurs may also be considered.

[f] Sixth Embodiment

A sixth embodiment of the communication apparatus according to the present invention is explained in detail below. Herein, only points different from the fifth embodiment are explained, and explanation of points in common with the fifth embodiment is omitted.

In the fifth embodiment, in the case in which the value of the number of alternate routing is 0 when return to a node corresponding to the local sender address occurs, such operation that a frame is returned to a node corresponding to the global sender address through the node corresponding to the local sender address, and the number of alternate routing of the returned meter data frame is initialized, and then the frame is retransmitted to a gateway of another destination candidate is described. In the present embodiment, operation when, in the event of occurrence of return to a node corresponding to the local sender address, the node is the node corresponding to the global sender address is explained.

When return to a node corresponding to the local sender address occurs from one node, if the value of the number of alternate routing is 1 or more, and when an address of a node that receives the returned frame and the global sender address of the returned frame coincide with each other, the node that receives the returned frame immediately retransmits the returned frame to a gateway of another destination candidate regardless of the value of the number of alternate routing of the returned frame. While in the fifth embodiment described above, a configuration in which the value of the number of alternate routing is initialized when retransmission to a gateway of another destination candidate is performed is described, it may be configured such that the value of the number of alternate routing is kept (not initialized).

As described, with such a configuration that when a frame is return to the global sender address, and when the value of the number of alternate routing is 1 or more, the destination is switched to a gateway of another destination candidate, not transmitting to a gateway currently selected, it is possible to suppress increase of time in which a network is delayed.

In each of the embodiments, a node that measures an amount of electricity (power usage amount) at a consumer site and information related thereto is explained as an example, it is also applicable to a case of measuring a usage amount of water, gas, or the like.

According to the present invention, it is possible to prevent occurrence of endless repetition of operation of alternate routing of paths in a state in which transfer to a certain device fails successively when a destination device has a failure or the like. As a result, increase of transfer delay time of a frame can be suppressed, and increase of time in which a frame stays on a network can be prevented.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data communication apparatus that forms a mesh network together with at least one gateway, the data communication apparatus comprising:
    a memory;
    a processor coupled to the memory, wherein
    the processor is configured to:
        generate a meter data frame to transmit to a destination gateway, the meter data frame being a frame including meter data; and
        transfer the meter data frame received from another data communication apparatus, the meter data frame being addressed to the destination gateway, wherein
        the generating includes transmitting the meter data frame to which a number of alternate routing that indicates a number of allowable transmission attempts from a data communication apparatus adjacent to the destination gateway of the meter data frame to the destination gateway is added, and
        the transferring includes, when transmission of the meter data frame to the destination gateway, which is adjacent to the data communication apparatus, fails, and the number of alternate routing added to the meter data frame is 1 or more, changing the number of alternate routing added thereto to a value smaller by 1 than a value that has been set and transmitting the meter data frame to another data communication apparatus wherein
        the number of alternate routing indicates how many more times transmission of a meter data frame in which the same value is set in a global destination address and a local destination address is allowed to be attempted.

2. The data communication apparatus according to claim 1, wherein when transfer of the meter data frame to the destination gateway fails and the number of alternate routing added to the meter data frame is 0, the meter data frame is returned to a source of the meter data frame.

3. The data communication apparatus according to claim 1, wherein when a meter data frame transferred before is returned, the meter data frame is returned to a source that initially received the meter data frame.

4. The data communication apparatus according to claim 1, wherein when a meter data frame that is generated by the data communication apparatus is returned and another gateway different from the destination gateway to which the meter data frame has been addressed is present, the meter data frame is retransmitted setting the another gateway as a new destination thereof.

5. The data communication apparatus according to claim 1, wherein when a meter data frame that is generated by the data communication apparatus is returned, the number of alternate routing added to the meter data frame is 1 or more, and another gateway different from the destination gateway to which the meter data frame has been addressed is present, the meter data frame is retransmitted setting the another gateway as a new destination thereof, and initializing the added number of alternate routing.

6. The data communication apparatus according to claim 1, wherein when a returned meter data frame is received, it is determined that the destination gateway to which the meter data frame is addressed has a failure, and the destination gateway is excluded from destination candidates for transmission of the meter data frame performed in future.

7. The data communication apparatus according to claim 1, wherein when a gateway (GW) advertisement that is periodically broadcasted from each gateway including the destination gateway and that includes information relating to a source gateway is unable to be received, the source gateway of a source of the GW advertisement that is unable to be received is excluded from destination candidates of a subsequent meter data frame.

8. The data communication apparatus according to claim 1, wherein when a GW advertisement that is periodically broadcasted from each gateway including the destination gateway and that includes information relating to a source gateway is received, and when it is determined that a communication state between the source gateway and a higher-level device of the source gateway is abnormal based on the GW advertisement, the source gateway of a source of the GW advertisement is excluded from destination candidates of a subsequent meter data frame.

9. The data communication apparatus according to claim 1, wherein path information that is referred to when the meter data frame is transmitted is generated and retained based on a GW advertisement that is periodically broadcasted from each gateway including the destination gateway and that includes information relating to a source gateway and a presence informing frame that is periodically transmitted from other data communication apparatuses and that includes information relating to a source data communication apparatus, and in the case of forming the mesh network with a single unit of the source gateway, when a first period passes since reception of the GW advertisement from the source gateway fails, then generation and transmission of a meter data frame is suspended, and further, when a second period passes, the retained path information is initialized.

10. A data communication system comprising:
at least one gateway, including a destination gateway; and
a data communication apparatus configured to form a mesh network together with the destination gateway, wherein
the data communication apparatus includes:
a memory; and
a processor coupled to the memory, wherein
the processor is configured to:
generate a meter data frame that is a frame including meter data to transmit to the destination gateway; and
transfer the meter data frame addressed to the gateway and received from another apparatus, wherein
the generating includes transmitting the meter data frame to which a number of alternate routing that indicates a number of allowable transmission attempts from a data communication apparatus adjacent to the destination gateway of the meter data frame to the destination gateway is added, and
the transferring includes, when transmission of the meter data frame to the destination gateway fails, and the number of alternate routing added to the meter data frame is 1 or more, changing the number of alternate routing added thereto to a value smaller by 1 than a value that has been set and transmitting the meter data frame to another data communication apparatus, wherein
the number of alternate routing indicates how many more times transmission of a meter data frame in which the same value is set in a global destination address and a local destination address is allowed to be attempted.

11. A data communication method that is implemented in a communication system including at least one gateway and a plurality of wireless stations, the data communication method comprising:
forming, by the plurality of wireless stations, a mesh network together with a destination gateway, by a processor coupled to a memory;
first generating, by the plurality of wireless stations, a meter data frame that is a frame including meter data, to transmit to the destination gateway, by the processor;
second generating, by a first wireless station, a meter data frame to which a number of alternate routing that indicates a number of allowable transmission attempts from a second wireless station adjacent to the destination gateway of the meter data frame to the destination gateway is added, by the processor; and
transferring the meter data frame to another wireless station and changing the number of alternate routing added thereto to a value smaller by 1 than a value that has been set, when the second wireless station fails, to transfer the meter data frame to the destination gateway and the number of alternate routing added to the meter data frame is 1 or more, by the processor, wherein
the number of alternate routing indicates how many more times to attempt transmission of a meter data frame in which the same value is set in a global destination address and a local destination address is allowed to be attempted.

* * * * *